(12) United States Patent
Duvaux et al.

(10) Patent No.: US 12,540,184 B2
(45) Date of Patent: Feb. 3, 2026

(54) ASSOCIATION OF POLYCLONAL ANTIBODIES AND ANTI-PD1 OR ANTI-PDL1 ANTIBODIES FOR THE TREATMENT OF CANCER

(71) Applicant: XENOTHERA, Nantes (FR)

(72) Inventors: Odile Duvaux, Nantes (FR); Bernard Vanhove, Nantes (FR)

(73) Assignee: XENOTHERA, Nantes (FR)

( * ) Notice: Subject to any disclaimer, the term of this patent is extended or adjusted under 35 U.S.C. 154(b) by 1130 days.

(21) Appl. No.: 17/607,218

(22) PCT Filed: Apr. 28, 2020

(86) PCT No.: PCT/EP2020/061710
§ 371 (c)(1),
(2) Date: Oct. 28, 2021

(87) PCT Pub. No.: WO2020/221723
PCT Pub. Date: Nov. 5, 2020

(65) Prior Publication Data
US 2022/0227869 A1 Jul. 21, 2022

(30) Foreign Application Priority Data

Apr. 30, 2019 (EP) .................................. 19305556

(51) Int. Cl.
| | | |
|---|---|---|
| *C07K 16/28* | (2006.01) | |
| *A61K 39/00* | (2006.01) | |
| *A61P 35/00* | (2006.01) | |
| *C07K 16/30* | (2006.01) | |

(52) U.S. Cl.
CPC .......... *C07K 16/2818* (2013.01); *A61P 35/00* (2018.01); *C07K 16/2827* (2013.01); *C07K 16/3076* (2013.01); *A61K 2039/507* (2013.01)

(58) Field of Classification Search
None
See application file for complete search history.

(56) References Cited

U.S. PATENT DOCUMENTS

| | | | |
|---|---|---|---|
| 7,547,816 B2 | 6/2009 | Day et al. | |
| 2016/0075770 A1* | 3/2016 | Soulillou | A61K 39/39516 530/389.1 |

FOREIGN PATENT DOCUMENTS

| | | |
|---|---|---|
| EP | 335804 A1 | 10/1989 |
| EP | 3207055 A1 | 8/2017 |
| WO | 2013/114367 A2 | 8/2013 |

OTHER PUBLICATIONS

Lieping Chen and Xue Han, J Clin Invest. 2015; 125(9):3384-3391 doi: 10.1172/JCI80011 (Year: 2015).*

Mahoney et al., Nature Reviews Drug Discovery, 2015; 14: 561 (Year: 2015).*
Zhang et al.; "Polyclonal rabbit anti-human ovarian cancer globulins inhibit tumor growth through apoptosis Involving the caspase signaling"; Scientific Reports, vol. 4, No. 1, May 15, 2014, the whole document.
Schieferdecker et al.; "Potent in vitro and in vivo effects of polyclonal anti-human-myeloma globulilns"; Oncotarget, vol. 7, No. 41, Oct. 11, 2016, the whole document.
Hadi et al.; "Inhibition of tumor growth by mouse ROR1 specific antibody in a syngeneic mouse tumor model"; Immunology Letters, vol. 193, Nov. 22, 2017, the whole document.
Li et al.; "Polyclonal Rabbit Anti-Cancer-Associated Fibroblasts Globulins Induce Cancer Cells Apoptosis and Inhibit Tumor Growth"; International Journal of Biological Sciences, vol. 14, No. 12, Jan. 1, 2018, pp. 1621-1629.
Sharon et al.; "Recombinant polyclonal antibodies for cancer therapy"; Journal of Cellular Biochemistry, vol. 96, No. 2, Oct. 1, 2005, pp. 305-313.
Suarez et al.; "Anti-proliferative and pro-apoptotic effects induced by simultaneous inactivation of HER1 and HER2 through endogenous polyclonal antibodies"; Oncotarget, vol. 8, No. 47, Oct. 10, 2017, pp. 82872-82884.
Liu et al.; "Recent development in clinical applications of PD-1 and PC-L1 antibodies for cancer immunotherapy"; Journal of Hematology & Oncology, vol. 10, No. 1, Dec. 1, 2017, the whole document.
Shukla et al.; "A cocktail of polyclonal affinity enriched antibodies against melanoma mutations increases binding and inhibits tumor growth"; Journal of Immunological Methods, vol. 478, Dec. 5, 2019, the whole document.
Arnold et al.; "The Impact of Glycosylation of the Biological Function and structure of Human Immunoglobilins"; Annu. Rev. Immunol., 2007, vol. 25, pp. 21-50.
Bonaventura et al.; "Cold Tumors: A Therapeutic Challenge for Immunotherapy"; Frontiers in Immunology, vol. 10, article 168, Feb. 2019, whole document.
Cooper et al.; "Genetically Engineered Pigs"; The Lancet, vol. 342, Sep. 11, 1993, pp. 682-683.
De Romeuf et al.; "Chronic lymphocytic leukaemia cells are effeciently killed by an anti-CD20 monoclonal antibody selected for improved engagement of FccRIIIA/CD16"; British Journal of Haematology, vol. 140, 2008, pp. 635-643.
Durocher et al.; "Expression systems for therapeutic glycoprotein production"; Current Opinion in Biotechnology, vol. 20, 2009, pp. 700-707.
Lai et al.; "Production of alpha-1,3-Galactosyltransferase Knockout Pigs by Nuclear Transfer Cloning"; Science, vol. 295, Feb. 8, 2002, pp. 1089-1092.

(Continued)

*Primary Examiner* — Christina M Borgeest
(74) *Attorney, Agent, or Firm* — WCF IP

(57) ABSTRACT

The present invention relates to an association of non-human mammal polyclonal antibodies directed against cancer cells; and at least one monoclonal antibody selected from the group consisting of anti-PD1 and anti-PDL1 monoclonal antibodies for its use for preventing and/or treating a cancer in a mammal patient. The association as such is also considered.

13 Claims, 4 Drawing Sheets

(56) References Cited

OTHER PUBLICATIONS

Merrick et al.; "Characterization of the Hanganutziu-Deicher (Serum-Sickness) Antigen as Gangliosides Containing N-Glycolylneuraminic Acid"; Int. Archs Allergy Appl. Immun., vol. 57, 1978, pp. 477-480.
Noguchi et al.; "Immunogenicity of N-Glycolylneuraminic Acid-Containing Carbohydrate Chains of Recombinant Human Erythropoietin Expressed in Chinese Hamster Ovary Cells"; Journal of Biochemistry, vol. 117, No. 1, 1995, pp. 59-62.
Sachs et al.; "Genetic Manipulation in Pigs"; Current Opinion in Organ Transplantation, vol. 14, No. 2, Apr. 2009, pp. 148-153.
Strainic et al.; "Locally Produced Complement Fragments C5a and C3a Provide Both Costimulatory and Survival Signals to Naive CD4+ T Cells"; Immunity, vol. 28, Mar. 2008, pp. 425-435.
Wang et al.; "Enhanced Inhibition of Human Anti-Gal Antibody Binding to Mammalian Cells by Synthetic alpha-Gal Epitope Polymers", Journal of American Chemical Society, vol. 121, 1999, pp. 8174-8181.
Topalian, S. et al., "Safety, Activity, and Immune Correlates of Anti-PD-1 Antibody in Cancer", New England Journal of Medicine 366:26, 2012.

\* cited by examiner

ASSOCIATION OF POLYCLONAL ANTIBODIES AND ANTI-PD1 OR ANTI-PDL1 ANTIBODIES FOR THE TREATMENT OF CANCER

FIELD OF THE INVENTION

The present invention relates to the field of immunology and more particularly to an association of polyclonal antibodies and monoclonal anti-PD1 and/or anti-PDL1 antibodies, and their use in human medicine.

In particular, the present invention relates to the use of an association of polyclonal non-human mammal antibodies and monoclonal anti-PD1 and/or anti-PDL1 antibodies in the treatment of cancers.

DESCRIPTION OF RELATED ART

Cancer is the second leading cause of death in the world, and is responsible for an estimated 9.6 million deaths in 2018. Globally, about 1 in 6 deaths worldwide is due to cancer. Inaccessible or non-sufficiently active treatment are common in this filed. There is thus a well-recognized need to develop new and improved therapies for treating cancers.

Immunotherapies represent a real hope in the treatment of a great number of cancers, in particular in the treatment of cancers not currently efficiently cured by conventional therapies. This treatment mainly consists in the administration of monoclonal antibodies directed against the tumoral cells or directed against activators or inhibitors of a checkpoint of the immune response against cancers.

Antibodies directed against tumors (passive immunotherapy) can act through two complementary ways:
- by cytotoxicity complement dependent (CDC) or dependent from killer cells (ADCC) or dependent from phagocytes (ADCP).
- by induction of an adaptative immune response. It has indeed been demonstrated that opsonization of a target and the local production of complement's molecules (C3a, C5a) (see Strainic et al., Immunity, 2008 March; 28(3):425-35) activates the T lymphocyte co-stimulation and increases its survival. Thus, the passive administration of antitumor antibodies can, as a first step, generate the discharge of factors from the complement that, in a second step, ease the T cells response.

However, from 40% to 85% of the patients are resistant to treatments based on the use of monoclonal antibodies. The escaping mechanisms comprise immunoselection mechanisms, i.e. the capacity of the tumoral cell to lose the antigen recognized by the immune system and immunosubversion mechanisms (induction of a specific tolerance). The appearance of less immunogenic tumoral variants can be particularly deleterious within treatments based on the use of monoclonal antibodies (which are specific to a unique epitope).

Accordingly, a treatment based on the use of polyclonal antibodies targeting different epitopes on the tumoral cells might allow minimizing the escaping mechanisms.

However, despite their potential efficacy, polyclonal antibodies have rarely been used in the treatment of tumors due in particular to high toxic risks in patients. This toxicity is mainly based on the fact that many cell surface antigens are expressed on many different cell types in an organism, which can lead to major cross-reactivities with non-cancerous cells. The toxicity is also linked to the expression of Neu5GC and alpha-1,3-galactose carbohydrates on animal immunoglobulins which in human elicit potent anti-Neu5GC and anti-alpha-1,3-galactose immune responses associated with allergy, serum sickness disease and formation of immune complexes. Moreover, these cross-reactivities were also linked to another problem which was that it "diluted" the efficient antibodies in the organism, i.e. a significant amount of the administered polyclonal antibodies population bound in sites different from the actual cancer target. This loss of effective antibodies in the targeted tumor necessitated the administration of a greater amount of polyclonal antibodies in the patient, which of course led to an aggravation of the associated toxic effects.

Thus, there remains a need in the art for the provision of an effective and improved therapy for treating cancers and endowed with reduced or no adverse effects.

The resistance of many tumors to treatments based on the use of monoclonal antibodies can also come from the existence of "cold tumors" (Bonaventura et al., 2019; Front. Immunol.; 10; 168), i.e. tumors that for various reasons contain few infiltrating immune cells, in particular few infiltrating T cells, and thus that do not provoke a strong response from the immune system, making them highly difficult to treat with immunotherapies. Indeed, in this kind of tumors, the response rate to therapeutic antibodies, such as for example therapeutic monoclonal antibodies targeting immune checkpoints commonly used in the treatment of tumors, remains relatively low and thus ineffective.

Thus, there remains a need in the art for the provision of an effective treatment allowing the treatment of cold tumors.

There also remains a need in the art for the provision of a mean to turn cold tumors into "hot tumors", i.e. tumors that contain sufficient levels, or even high levels, of infiltrating T cells as explained above.

There in particular remains a need in the art for the provision of a mean to reduce the resistance of "cold" tumors to monoclonal antibodies targeting immune checkpoints, by improving, i.e. increasing, the capacity of these tumors to be infiltrated by immune cells, and in particular by T cells and myeloid cells, more particularly T cells.

SUMMARY OF THE INVENTION

According to a first of its aspects, the invention relates to an association of:
- non-human mammal polyclonal antibodies directed against cancer cells; and
- at least one monoclonal antibody selected from the group consisting of anti-PD1 and anti-PDL1 monoclonal antibodies, for its use for preventing and/or treating a cancer in a mammal patient.

The non-human mammal polyclonal antibodies of an association according to the invention are directed against cancer cells corresponding, or even belonging, to the cancer to be prevented or treated in the mammal patient.

The inventors show for the first time that the combined in vivo administration of polyclonal antibodies directed against a cancer, and in particular against a liver cancer, together with the monoclonal anti-PDL1 antibodies, provides an unexpectedly high efficiency against the targeted tumor. In particular, the inventors observe a synergistic action of these actives on the treatment of tumors.

Moreover, several weeks after the treatment, the surviving animals had no evidence of visible disease by histopathologic evaluation or toxicity (no auto-immunity detected, i.e. no distress, no weight loss, no coloration of the animals, no hairs loss or diarrhea).

Accordingly, the inventors managed to determine a new, effective, improved and non toxic therapy for treating cancers.

In a particular embodiment, the polyclonal antibodies of an association according to the invention are devoid of:
- a first antigenic determinant selected in a group consisting of (i) N-glycolneuraminic acid (Neu5Gc) and (ii) α-1,3-galactose; and
- a second antigenic determinant distinct from the first antigenic determinant and selected in a group consisting of (i) N-glycolneuraminic acid (Neu5Gc) and (ii) α-1,3-galactose.

More particularly, the polyclonal antibodies can be devoid of the two antigenic determinants (i) N-glycolneuraminic acid (Neu5Gc) and (ii) α-1,3-galactose.

In a particular embodiment, the polyclonal antibodies are Immunoglobulin G (IgG).

In a further embodiment, the monoclonal antibody of an association according to the invention is an anti-PDL1 antibody.

In another embodiment, the non-human mammal is selected from the group consisting of rodents, such as mice, rats, guinea pigs and hamsters; lagomorphs, such as rabbits; ferrets; felines, such as cats; canines, such as dogs; goats; sheep; bovines, such as cows; swines, such as pigs and hogs; camelids; horses and primates.

In particular, the said non-human mammal can be selected from the group consisting of rodents, such as mice, rats, guinea pigs and hamsters and lagomorphs, such as rabbits.

More particularly, the said non-human mammal can be selected from the group consisting of lagomorphs, goats, sheep, pigs, horses and bovines.

In a particular embodiment, the mammal patient is selected from the group consisting of rodents, such as mice, rats, guinea pigs and hamsters; lagomorphs, such as rabbits; ferrets; felines, such as cats; canines, such as dogs; goats; sheep; camels; bovines, such as cows; swines, such as pigs and hogs; alpacas; horses; primates and human beings.

In particular, the said mammal patient can be selected from the group consisting of rodents, such as mice, rats, guinea pigs and hamsters.

In particular, the said mammal patient can be a human being.

In a particular embodiment, the said mammal patient can be selected from the group consisting of rodents, such as mice, rats, guinea pigs and hamsters; and human beings.

In another embodiment, the cancer cells are selected from the group consisting of bladder cancer, breast cancer, colorectal cancer, kidney cancer, lung cancer, lymphoma, leukemia, myeloma, melanoma, oral or oropharyngeal cancer, pancreatic cancer, prostate cancer, thyroid cancer, uterine cancer, adenoid cystic carcinoma, adrenal gland tumor, amyloidosis, anal cancer, appendix cancer, cholangiocarcinoma, bone cancer, brain cancer, central nervous system tumors, cervical cancer, esophageal cancer, eye cancer, eyelid cancer, gastrointestinal cancer, HIV/AIDS-related cancer, lacrimal gland cancer, laryngeal or hypopharyngeal cancer, leukemia, liver cancer, meningioma, nasopharyngeal cancer, ovarian cancer, fallopian tube cancer, peritoneal cancer, parathyroid cancer, penile cancer, salivary gland cancer, sarcoma, non-melanoma skin cancer, small bowel cancer, stomach cancer, testicular cancer, thymoma and thymic carcinoma, vaginal cancer and vulvar cancer.

In particular, the cancer cells are from a liver cancer.

In a particular embodiment, the non-human mammal polyclonal antibodies and the at least one monoclonal anti-PD1 or anti-PDL1 antibody are administered to the mammal patient in the same composition or in separate compositions, preferably in separate compositions.

In another embodiment, the association according to the invention further comprises at least one additional anticancer drug different:
- from the said non-human mammal polyclonal antibodies; and
- from a monoclonal anti-PD1 or anti-PDL1 antibody.

In particular, the at least one additional anticancer drug can be a monoclonal antibody, different from a monoclonal anti-PD1 or anti-PDL1 antibody.

In particular, the at least one additional anticancer drug can be a monoclonal antibody selected from the group consisting of anti-CD137, anti-CTLA4, anti-TIM-3, anti-B7-H3, anti-CD134, anti-CD154, anti-LAG-3, anti-CD227, anti-BTNA3, anti-CD39, anti-CD73, anti-CD115, anti-SIRP alpha, anti-SIRP gamma, anti-CD28, anti-NCR, anti-NKp46, anti-NKp30, anti-NKp44, anti-NKG2D and anti-DNAM-1 monoclonal antibodies.

A further object of the invention relates to an association of:
- non-human mammal polyclonal antibodies directed against cancer cells; and
- at least one monoclonal antibody selected from the group consisting of anti-PD1 and anti-PDL1 monoclonal antibodies.

Serums were collected in pre-immunized rabbits (Rabbit—J0), 7 days after the first subcutaneous injection (Rabbit—I1+7) and 7 days after the second subcutaneous injection (Rabbit—I2+7).

Ordinate: Optical density (DO 450 nm)

Abscissa: Serial dilutions of the collected serums. From left to right: 1:20; 1:60; 1:180; 1:540; 1:1620; 1:4860; 1:14580; 1:43740.

Figure 2:
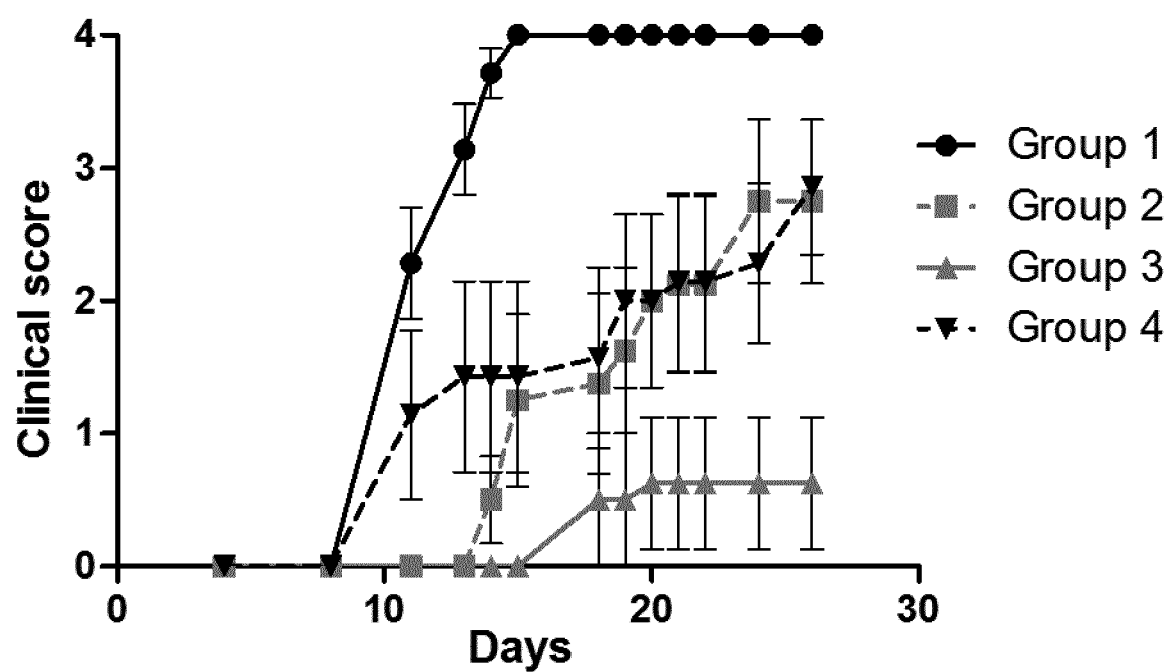

FIG. 2: represents the clinical scores measured in 8 weeks old C57/BL6J immunocompetent mice from the first day of their injection with $2.5 \cdot 10^6$ of Hepa 1.6 cells in the portal artery, and during the 30 following days. The different treatments were administered 4 days after injection of Hepa 1.6 cells (D4).

A clinical score of 1 corresponds to animals presenting bristly hairs and a slightly swollen abdomen. A clinical score of 2 corresponds to animals presenting a swollen abdomen and facial edema. A clinical score of 3 corresponds to animals presenting a swollen abdomen and an exophthalmia. A clinical score of 4 corresponds to animals presenting a highly swollen abdomen (diameter>9 cm), prostration, hunched back, isolation (leading to the sacrifice of the individual).

Four different treatment groups were formed.

The first group (group 1; n=7; control), received: control isotype (3G8: irrelevant monoclonal antibody (mAb)—isotype IgG1) (8 mg/kg 2 times a week for 28 days)+preimmune polyclonal antibodies of rabbits (20 mg/kg 2 times a week for 28 days).

The second group (group 2; n=8; comparative), received: control isotype (3G8: irrelevant monoclonal antibody (mAb)—isotype IgG1; 8 mg/kg 2 times a week for 28 days)+polyclonal anti-Hepa 1.6 cells antibodies isolated from the serum of immunized rabbits (20 mg/kg 2 times a week for 28 days).

The third group (group 3; n=8), received: monoclonal anti-PDL-1 antibodies (8 mg/kg 2 times a week for 28 days)+polyclonal anti-Hepa 1.6 cells antibodies isolated from the serum of immunized rabbits (20 mg/kg 2 times a week for 28 days).

The fourth group (group 4; n=7; comparative), received: monoclonal anti-PDL-1 antibodies (8 mg/kg 2 times a week for 28 days)+pre-immune polyclonal antibodies of rabbits (20 mg/kg 2 times a week for 28 days).

The mean clinical values obtained are indicated in the graphic.

Ordinate: clinical score

Abscissa: days.

Figure 3:
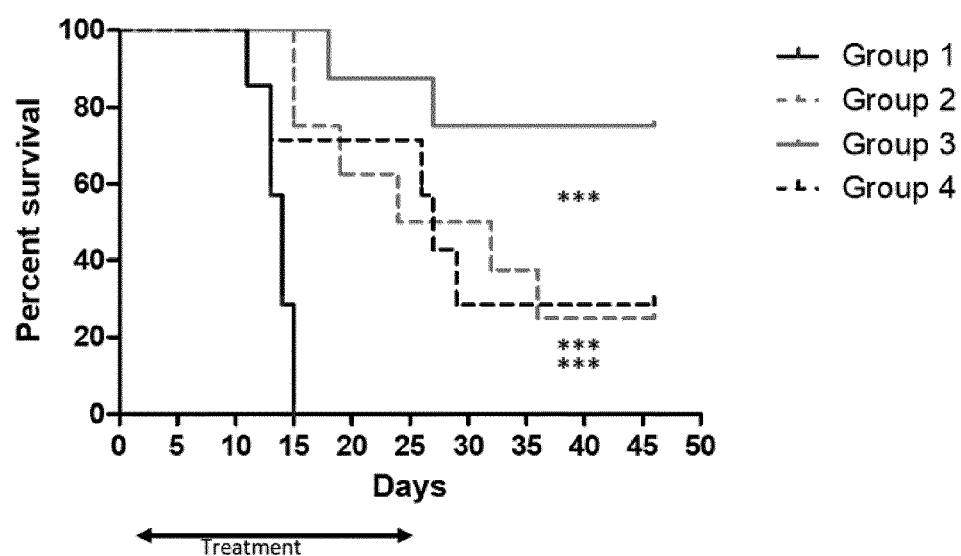

FIG. 3: represents the percent of survival of 8 weeks old C57/BL6J immunocompetent mice from the first day of their treatment, which happened 4 days after injection with $2.5 \cdot 10^6$ of Hepa 1.6 cells in the portal artery, and during the 50 following days.

The represented group 1, group 2, group 3 and group 4 are the same groups as those defined in FIG. 2.

Ordinate: percent survival

Abscissa: days.

Figure 4:
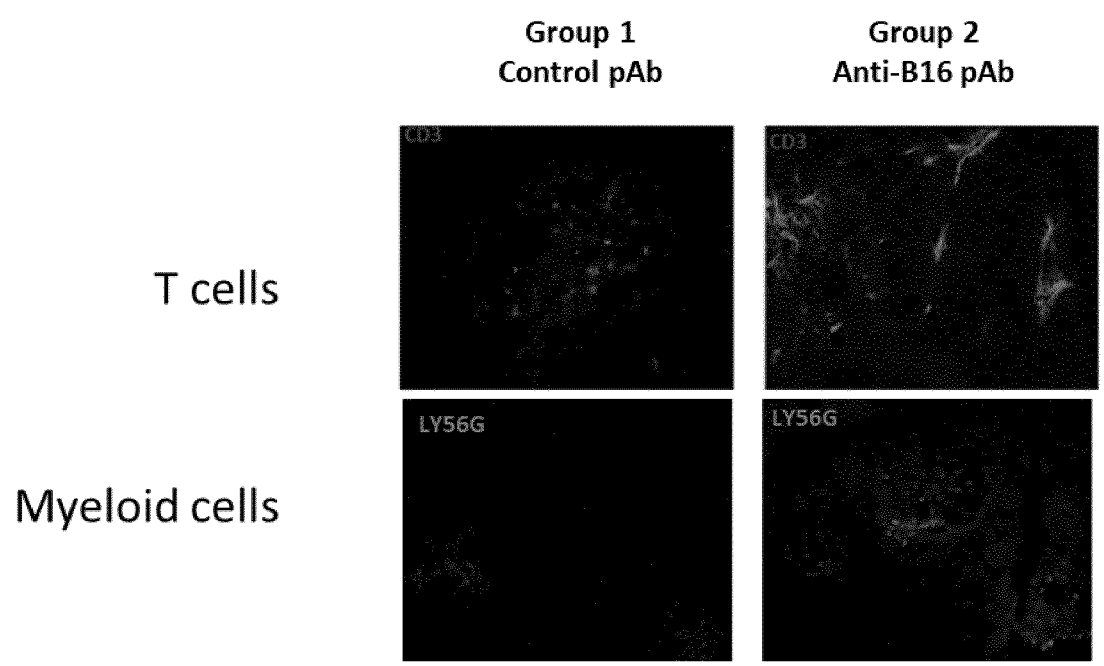

FIG. 4: represents immunohistology results obtained by revealing either CD3+ T cells (first line) or LY6G+myeloid cells (second line) into tumor biopsies, said tumors being obtained by subcutaneously implanting Balb/C mice with B16F10 melanoma cells. Two groups are concerned:

Group 1 (Control pAb; n=7), received: pre-immune polyclonal antibodies of rabbits (20 mg/kg 2 times a week for 28 days).

Group 2 (Anti-B16 pAb; n=8), received: IgG fraction of anti-tumoral polyclonal antibodies obtained from rabbits immunized with mouse B16F10 melanoma cells, infused biweekly (12.5 mg/kg two times a week) from day 4 (D4) to day 30 (D30).

DETAILED DESCRIPTION OF THE INVENTION

1. Definitions

In order for the invention to be more completely understood, several definitions are set forth below. Such definitions are meant to encompass grammatical equivalents.

The term "antibody" is used herein in the broadest sense. "Antibody" refers to any polypeptide which at least comprises (i) a Fc region and (ii) a binding polypeptide domain derived from a variable region of an immunoglobulin. Antibodies thus include, but are not limited to, full-length immunoglobulins, antibodies, antibody conjugates and fragments of each respectively. The terms "antibody" and "immunoglobulin" may be used interchangeably herein.

The term "antibody" encompasses a polypeptide as above-mentioned which can comprise or be devoid of the antigenic determinant selected in a group comprising (i) N-glycolneuraminic acid (Neu5Gc) and/or (ii) α-1,3-galactose, and in particular can comprise or be devoid of the two antigenic determinants (i) N-glycolneuraminic acid (Neu5Gc) and (ii) α-1,3-galactose.

By "polyclonal antibodies" as used herein is meant a mixture of antibodies recognizing different epitopes of a given antigen and/or cell. Polyclonal antibodies encompass those which are contained in, or alternatively which are derived from, body fluids, especially serum or plasma from a mammal organism, in particular from a non-human mammal organism.

In the case of human immunoglobulins, light chains are classified as kappa and lambda light chains. Heavy chains are classified as mu, delta, gamma, alpha, or epsilon, and define the antibody's isotype as IgM, IgD, IgG, IgA, and IgE, respectively.

By "IgG" as used herein is meant a polypeptide belonging to the class of antibodies that are substantially encoded by a recognized immunoglobulin gamma gene. In humans, IgG comprises the subclasses or isotypes IgG1, IgG2, IgG3, and IgG4. In mice, IgG comprises IgG1, IgG2a, IgG2b, IgG3. Full-length IgGs consist of two identical pairs of two immunoglobulin chains, each pair having one light and one heavy chain, each light chain comprising immunoglobulin domains VL and CL, and each heavy chain comprising immunoglobulin domains VH, Cγ1 (also called CH1), Cγ2 (also called CH2), and Cγ3 (also called CH3).

A "physiologically acceptable medium" according to the invention means a carrier or excipient that is physiologically acceptable to the treated mammal patient while retaining the therapeutic properties of the compounds with which it is administered. One exemplary pharmaceutically acceptable medium is physiological saline. Other physiologically acceptable media in the case of the present invention are known to those skilled in the art.

As used herein, "Antibody-dependent cell-mediated toxicity" (or ADCC) refers to a mechanism of cell-mediated immunity whereby an effector cell of the immune system actively lyses a target cell that has been bound by specific antibodies. ADCC is mostly mediated by NK cells but also by other immune cells such as neutrophils and eosinophils. Typically, ADCC results from the activation of NK cells. The activation of NK cells involves the binding of their Fc receptors to the Fc region of IgG bound to antigens present on the surface of target cells. Such interactions induce the release by NK cells of cytokines and cytotoxic granules. To assess the capacity of an antibody to induce ADCC, an assay, as described in de Romeuf et al. Br J Haematol. 2008 March; 140(6):635-43, may be performed.

By "antigenic determinant" (or epitope), as applied herein to non-human mammal polyclonal antibodies, as used herein is meant a structural component of an antigenic molecule, which includes an antigenic protein and an antigenic carbohydrate, responsible for its specific interaction with antibody molecules elicited by the same or related antigen. By extension, the term "antigenic determinant", as applied herein to non-human mammal polyclonal antibodies, is also used collectively herein for an antigenic molecule comprising a plurality of epitopes susceptible to be recognized by antibody molecules elicited by the same or related antigen. Illustratively, the antigenic molecule N-glycolneuraminic acid (Neu5Gc) may be called herein an "antigenic determinant", although the said antigenic molecule may contain more than one epitope recognized by antibodies elicited with Neu5Gc or with Neu5Gc containing molecules.

In blood, the "serum" is the plasma-derived component wherein cells (white blood cells as well as red blood cells) and clotting factors have been removed. Serum includes all proteins not used in blood clotting (coagulation) and all the electrolytes, antibodies, antigens, hormones, and any eventually also exogenous substances (e.g. drugs and microorganisms).

The terms "malignant cells", "cancer cells" and "tumor cells" may be used interchangeably herein. As used herein, "tumor cells" refer to cells which hyperproliferate autonomously in vivo. Examples of tumor cells include cells included in (1) sarcomas such as osteosarcoma and soft tissue sarcoma, (2) carcinomas such as carcinoma of the breast, carcinoma of the lung, carcinoma of the bladder, carcinoma of the thyroid gland, carcinoma of the prostate, carcinoma of the colon, colorectal carcinoma, carcinoma of the pancreas, carcinoma of the stomach, carcinoma of the liver, carcinoma of the uterus, carcinoma of the cervix and carcinoma of the ovary, (3) lymphomas such as Hodgkin lymphoma and non-Hodgkin lymphoma, (4) neuroblastomas, (5) melanomas, (6) myelomas, (7) Wilms tumors, (8) leukemias such as acute myelocytic leukemia (AML), chronic myelocytic leukemia (CML), acute lymphocytic leukemia (ALL) and chronic lymphocytic leukemia (CLL), (9) gliomas, and (10) retinoblastomas.

As used herein, the term "cancer" means the uncontrolled, abnormal growth of cells and includes within its scope all the well known diseases that are caused by the uncontrolled and abnormal growth of cells. Non-limiting examples of common cancers include bladder cancer, breast cancer, ovarian cancer and gastric cancer, cervical cancer, colon cancer, endometrial cancer, head and neck cancer, lung cancer, melanoma, multiple myeloma, leukemia (e.g. myeloid, lymphocytic, myelocytic and lymphoblastic leukemias), non-Hodgkin's lymphoma, prostate cancer, rectal cancer, malignant melanomas, and in particular pancreatic cancer.

In particular, cancer cells of the invention can be cells included in cancers selected from the group consisting of bladder cancer, breast cancer, colorectal cancer, kidney cancer, lung cancer, lymphoma, melanoma, oral or oropharyngeal cancer, pancreatic cancer, prostate cancer, thyroid cancer, uterine cancer, adenoid cystic carcinoma, adrenal gland tumor, amyloidosis, anal cancer, appendix cancer, cholangiocarcinoma, bone cancer, brain cancer, central nervous system tumors, cervical cancer, esophageal cancer, eye cancer, eyelid cancer, gastrointestinal cancer, HIV/AIDS-related cancer, lacrimal gland cancer, laryngeal or hypopharyngeal cancer, leukemia, liver cancer, meningioma, nasopharyngeal cancer, ovarian cancer, fallopian tube cancer, peritoneal cancer, parathyroid cancer, penile cancer, salivary gland cancer, sarcoma, non-melanoma skin cancer, small bowel cancer, stomach cancer, testicular cancer, thymoma and thymic carcinoma, vaginal cancer and vulvar cancer.

In a particular embodiment, a cancer, or tumor, of the invention is a cold tumor. "Cold tumors" are terms commonly used to designate "non-inflamed" tumors, i.e. tumors characterized by a lack of T cells infiltrate. They are tumors commonly known for being challenging as no adaptive immune response has been set up or maintained. They are opposed to "hot tumors", or "inflamed tumors", that are tumors infiltrated with T-cells in a quantity sufficient to trigger an adaptative response against them.

In particular, a cold tumor can be selected from the group consisting of bladder cancer, breast cancer, colorectal cancer, kidney cancer, lung cancer, lymphoma, melanoma, oral or oropharyngeal cancer, pancreatic cancer, prostate cancer, thyroid cancer, uterine cancer, adenoid cystic carcinoma, adrenal gland tumor, amyloidosis, anal cancer, appendix cancer, cholangiocarcinoma, bone cancer, brain cancer, central nervous system tumors, cervical cancer, esophageal cancer, eye cancer, eyelid cancer, gastrointestinal cancer, HIV/AIDS-related cancer, lacrimal gland cancer, laryngeal or hypopharyngeal cancer, leukemia, liver cancer, meningioma, nasopharyngeal cancer, ovarian cancer, fallopian tube cancer, peritoneal cancer, parathyroid cancer, penile cancer, salivary gland cancer, sarcoma, non-melanoma skin cancer, small bowel cancer, stomach cancer, testicular cancer, thymoma and thymic carcinoma, vaginal cancer and vulvar cancer.

2. Association According to the Invention

With the view of responding to the aims mentioned above, and in particular in order to provide a new treatment against cancer, whose improved efficiency is not linked with any observable toxicity in the treated organism, the inventors have conceived an association of:
  non-human mammal polyclonal antibodies directed against cancer cells; and
  at least one monoclonal antibody selected from the group consisting of anti-PD1 and anti-PDL1 monoclonal antibodies.

An anti-PD1 monoclonal antibody according to the invention can for example be selected from the group consisting of Nivolumab, Pembrolizumab and Cemiplimab.

An anti-PDL1 monoclonal antibody according to the invention can for example be selected from the group consisting of Atezolizumab, Avelumab and Durvalumab.

In a preferred embodiment, the monoclonal antibody of an association according to the invention is an anti-PDL1 antibody.

An association according to the invention further comprises non-human mammal polyclonal antibodies directed against cancer cells.

The polyclonal antibodies are directed against the same cancer cells, i.e. they all target different epitopes from different or identical antigens present on the surface of the same cancer cells.

Polyclonal antibodies according to the invention can be obtained using a method comprising the steps of:
  a) immunizing a non-human mammal against cancer cells of interest; and
  b) collecting the antibodies contained in a body fluid of the said non-human mammal of step a).

The step of immunizing a non-human mammal against cancer cells of interest consists in injected the said cells into the non-human mammal.

A protocol to obtain a good level of immunization of the non-human transgenic mammal with respect to cells is notably described in EP 0 335 804.

Such protocol may notably consist in immunizing animals, such as rabbits, horses or pigs, preferably pigs, with repeated administration, according to known methods, of cancer cells.

For example, several administrations are performed, intravenously or subcutaneously, with or without adjuvant, of $4 \cdot 10^4$ to $10^9$ cells each time, the administrations being spaced of at least a week. About a week after the last immunization, serum is collected from immunized animals and isolated according to known methods.

The step of collecting the antibodies can for example consist in the removal of a portion of the blood fluid of the immunized non-human mammal from which the antibodies of interest are collected.

According to a particular embodiment, the said body fluid may be selected in a group comprising blood plasma and blood serum.

A protocol for obtaining a blood fluid, and more particularly a blood plasma or a blood serum, falls within the general knowledge of a man skilled in the art.

According to a preferred embodiment, and as above-mentioned, a method for obtaining polyclonal antibodies of the invention may further comprise a step of purifying the polyclonal antibodies from the said body fluid.

Said step of purifying is advantageous in that it notably allows overcoming possible unwanted side effects associated with the presence, within the body fluid, of various cellular contaminants which may involve, by the immunized non-human mammal, to the formation of corresponding contaminating antibodies.

Said step of purifying is also advantageous in that it allows obtaining polyclonal antibodies having a desired degree of purity.

Said step of purifying falls within the general knowledge of a man skilled in the art. All possible adaptation of any conventional purifying protocol also falls within the general knowledge of a man skilled in the art.

As an appropriate method for purifying these polyclonal antibodies of interest, may be cited the methods for purifying antibodies with an affinity support onto which coupled to the antigen, on protein G or on protein A, for example those commercialized by the companies ProteoGenix, Cell Biolabs, Inc. or CliniSciences or still disclosed in EP 1 601 697, JP 7 155 194 or U.S. Pat. No. 6,870,034.

May also be cited an affinity support for the selective fixation of the antibodies of interest from a blood fluid, comprising a solid support material having immobilized aptamer which specifically binds said antibodies of interest from a blood fluid. Such a method is notably disclosed in WO 2010/094901.

According to a particular embodiment, the polyclonal antibodies according to the invention are devoid of a first antigenic determinant selected in a group comprising (i) N-glycolneuraminic acid (Neu5Gc) and (ii) α-1,3-galactose.

According to a particular embodiment, the polyclonal antibodies may be further devoid of a second antigenic determinant which is distinct from the first antigenic determinant and wherein the said second antigenic determinant is selected in a group comprising (i) N-glycolneuraminic acid (Neu5Gc) and (ii) α-1,3-galactose.

Accordingly, the polyclonal antibodies can be devoid of the two antigenic determinants (i) N-glycolneuraminic acid (Neu5Gc) and (ii) α-1,3-galactose.

Polyclonal antibodies devoid of these antigenic determinants are believed to possess reduced immunogenic properties in human as compared with polyclonal antibodies comprising them.

It is known in the art that Neu5Gc is immunogenic in humans (Noguchi A. et al., J. Biochem. Tokyo (1995), 117(1): 59-62). Further, it is known that patients developing severe Immune Complex (IC) following infusion of animals immunoglobulins mount antibodies which are mostly developed against the Neu5Gc epitope (Merrick J M et al., Int. Allergy Appl. Immunol., 1978, Vol. 57: 477-480; Aggarwal S. et al., Nat Biotechnol. 2008; 26:1227-1233; Arnold J N et al., Annu Rev Immunol. 2007; 25:21-50; Durocher Y et al., Curr Opin Biotechnol. 2009; 20:700-707; Higgins E et al., Glycoconj. J. 2009).

It is also known in the art that the enzyme α1,3-galactosyltransferase (α1,3GT or GGTA1) synthesizes α1,3-galactose (α1,3Gal) epitopes (Galα1,3Galβ1,4GlcNAc-R), which are the major xenoantigens causing hyperacute rejection in pig-to-human xenotransplantation.

According to these embodiments, polyclonal antibodies according to the invention can be obtained using a method comprising the steps of:
a) providing a genetically altered non-human mammal lacking a first gene selected in a group comprising (i) a gene encoding a functional cytidine-5'-monophosphate N-acetyl neuraminic acid hydrolase (CMAH) and (ii) a gene encoding a functional α-(1,3)-galactosyltransferase;
b) immunizing the said genetically altered non-human mammal against human cells; and
c) collecting the antibodies contained in a body fluid of the said genetically altered non-human mammal of step b).

Preferably, the said genetically altered non-human mammal is a CMAH and/or GGTA1 knockout non-human transgenic mammal (or CMAH and/or GGTA1 KO non-human mammal), which includes a CMAH and GGTA1 double-knockout non-human transgenic mammal.

As used herein, a "knockout non-human transgenic mammal" consists of a non-human transgenic mammal in which the function of one or more alleles of the considered gene has been altered, for example, by homologous recombination or other insertion or deletion.

In certain embodiments, this gene is disrupted. By "disrupted gene" is meant a portion of the genetic code has been altered, thereby affecting transcription and/or translation of that segment of the genetic code, e.g., rendering that segment of the code unreadable through knockout techniques or by insertion of an additional gene for a desired protein or insertion of a regulatory sequence that modulates transcription of an existing sequence.

In some embodiments, all of the cells of the non-human transgenic mammal include the disrupted gene.

In certain embodiments, the knockout non-human transgenic mammal is a non-human transgenic mammal in which one or more alleles of the considered gene has been rendered nonfunctional.

In some embodiments, both alleles of the considered gene are rendered non-functional. Such embodiments include those commonly referred to as "gene knockouts," "gene knock-ins" and any other modification of one or more native allele of the native considered gene that renders such gene non-functional. Such non-human transgenic mammal can be useful as the source for producing polyclonal antibodies according to the present invention.

A method for obtaining a genetically altered non-human mammal lacking a gene selected in a group comprising (i) a gene encoding a functional cytidine-5'-monophosphate N-acetyl neuraminic acid hydrolase and/or (ii) a gene encoding a functional α-(1,3)-galactosyltransferase falls within the general knowledge of a man skilled in the art.

A method for obtaining a CMAH knockout non-human transgenic mammal is notably described in WO 2006/133356 which more particularly discloses a method for producing animal products devoid of N-glycomeuraminic acid (Neu5Gc) for human use comprising the steps of: preparing a genetically altered non-human mammal lacking a functional cytidine-5'-monophosphate N-acetyl neuraminic acid hydrolase (CMAH) gene; and extracting at least one animal product from the genetically altered non-human animal.

A method for obtaining a GAL knockout non-human transgenic mammal falls within the general knowledge of the man skilled in the art (Cooper D K et al., Genetically engineered pigs, Lancet 1993, 342: 682; Lai L et al., Science 2002, 295: 1089; Sachs D H et al., Current Opinion in Organ Transplantation, 2009, 14:148-153).

A method for obtaining a GAL knockout non-human transgenic mammal is notably described in U.S. Pat. No. 7,547,816.

As it is known in the art, antibodies against mammal cells, and in particular cancer mammal cells, may easily be obtained by immunizing a non-human mammal by administration of an immunogenic composition comprising the cancer cells of interest.

A method intended to identify or characterize these particular forms of polyclonal antibodies according to the present invention devoid of a first antigenic determinant selected in a group comprising (i) N-glycolneuraminic acid (Neu5Gc) and (ii) α-1,3-galactose. falls within the general knowledge of a man skilled in the art.

A method that may be used by the one skilled in the art for identifying or characterizing such particular polyclonal antibodies according to the invention includes an Enzyme-linked immuno sorbent assay (ELISA) wherein anti-Neu5Gc antibodies and/or anti-Gal antibodies are used as detection molecules.

As anti-Neu5Gc antibodies for assessing the lack of Neu5Gc antigenic determinant, it may be cited the Gc-Free Basic Kit commercialized by the company Sialix, Inc.

As anti-Gal antibodies to demonstrate the lack of α-1,3-galactose antigenic determinant, may be considered the protocol disclosed in Jianq-Qiang Wang et al. (J. Am. Chem. Soc., 1999, 121: 8181) or those commercialized under the name WH0051083M1 Sigma by the company Sigma-Aldrich.

In particular, an association according to the invention can further comprise at least one additional anticancer drug different:
from the said non-human mammal polyclonal antibodies; and
from a monoclonal anti-PD1 or anti-PDL1 antibody.

More particularly, the at least one additional anticancer drug can be a monoclonal antibody different from a monoclonal anti-PD1 or anti-PDL1 antibody.

In particular, the at least one additional anticancer drug can be a monoclonal antibody selected from the group consisting of anti-CD137, anti-CTLA4, anti-TIM-3, anti-B7-H3, anti-CD134, anti-CD154, and anti-LAG-3, anti-CD227, anti-BTNA3, anti-CD39, anti-CD73, anti-CD115, anti-SIRP alpha, anti-SIRP gamma, anti-CD28, anti-NCR, anti-NKp46, anti-NKp30, anti-NKp44, anti-NKG2D and anti-DNAM-1 monoclonal antibodies.

3. Medical Uses According to the Invention

As above-mentioned, the present invention, according to one of its aspects, relates to an association of:
non-human mammal polyclonal antibodies directed against cancer cells; and
at least one monoclonal antibody selected from the group consisting of anti-PD1 and anti-PDL1 monoclonal antibodies,
for its use for preventing and/or treating a cancer in a mammal patient.

These polyclonal and monoclonal antibodies are described throughout the present specification.

As previously mentioned, the non-human mammal polyclonal antibodies of an association according to the invention are directed against cancer cells corresponding, or even belonging, to the cancer to be prevented or treated in the mammal patient.

In order to treat a patient in need, such as above-mentioned, a therapeutically effective dose of the association according to the invention may be administered.

By "therapeutically effective dose" herein is meant a dose that produces the effects for which it is administered. The exact dose will depend on the purpose of the treatment, and will be ascertainable by one skilled in the art using known techniques.

Dosages may range from 0.001 to 100 mg of polyclonal antibodies according to the invention per kg of body weight (mg/kg) or greater, for example 0.1, 1.0, 10, or 50 mg/kg of body weight. In particular, the dosages may range from 0.1 to 100 mg/kg, or more particularly from 1 to 10 mg/kg of polyclonal antibodies according to the invention.

Dosages may also range from 0.001 to 100 mg of anti-PD1 and/or anti-PDL1 monoclonal antibodies according to the invention per kg of body weight (mg/kg) or greater, for example 0.1, 1.0, 10, or 50 mg/kg of body weight. In particular, the dosages may range from 0.1 to 100 mg/kg, or more particularly from 1 to 10 mg/kg of anti-PD1 and/or anti-PDL1 monoclonal antibodies according to the invention.

The dosage and frequency of administration may be adapted depending of the host response as well as the frequency of injection owing to a better tolerance.

For illustrative purposes only, the frequency of administration of an association according to the invention could be a daily administration for 5 to 15 consecutive days.

As is known in the art, adjustments for protein degradation, systemic versus localized delivery, as well as the age, body weight, general health, sex, diet, time of administration, drug interaction and the severity of the condition may be necessary, and is easily determined with routine experimentation by those skilled in the art.

Administration of the association of the invention may be done in a variety of ways, including, but not limited to, orally, subcutaneously, intravenously, parenterally, intranasally, intraortically, intraocularly, rectally, vaginally, transdermally, topically (e.g., gels), intraperitoneally, intramuscularly, intrapulmonary or intrathecally.

In a particular embodiment, an association according to the invention is in a form suitable for administration by intravenous or parenteral route.

As mentioned above, the invention relates to an association of:
non-human mammal polyclonal antibodies directed against cancer cells; and
at least one monoclonal antibody selected from the group consisting of anti-PD1 and anti-PDL1 monoclonal antibodies, for its use for preventing and/or treating a cancer in a mammal patient.

The non-human mammal polyclonal antibodies directed against cancer cells and the at least one monoclonal antibody selected from the group consisting of anti-PD1 and anti-PDL1 monoclonal antibodies may be combined within one and the same composition, or may be used in the form of separate compositions, which may be administered simultaneously or sequentially.

In a particular embodiment, the non-human mammal polyclonal antibodies directed against cancer cells and the at least one monoclonal antibody selected from the group consisting of anti-PD1 and anti-PDL1 monoclonal antibodies are administered in separate compositions.

When the non-human mammal polyclonal antibodies directed against cancer cells and the at least one monoclonal antibody selected from the group consisting of anti-PD1 and anti-PDL1 monoclonal antibodies are administered in separate compositions, the compositions can be administered to the mammal patient simultaneously or separately through the same route of through different routes.

By simultaneously, it is understood that the compositions can be administered at the same moment or up to the same day or couple of days.

By separately, it is understood that the compositions can be administered with at least several days, for example at least two days of difference.

In some embodiments, a composition of polyclonal antibodies and a composition of anti-PD1 and/or anti-PDL1 monoclonal antibod(y)ies according to the invention is(are) in liquid form.

In some of the embodiments, a composition of polyclonal antibodies and a composition of anti-PD1 and/or anti-PDL1 monoclonal antibod(y)ies according to the invention is(are) in a solid form, which includes a lyophilized form.

These compositions may be formulated according to standard methods such as those described in Remington: The Science and Practice of Pharmacy (Lippincott Williams & Wilkins; Twenty first Edition, 2005).

The compositions mentioned above comprise a physiologically/pharmaceutically acceptable medium/excipient. The terms "physiologically acceptable" and "pharmaceutically acceptable" are used interchangeably in the present text.

Pharmaceutically acceptable excipients or mediums that may be used are, in particular, described in the Handbook of Pharmaceuticals Excipients, American Pharmaceutical Association (Pharmaceutical Press; 6th revised edition, 2009).

The association of the invention may be administered with other therapies or therapeutics, including for example, small molecules, other biologicals, radiation therapy, surgery, etc, which are different from the additional anticancer drug mentioned above and which is also different:
from the said non-human mammal polyclonal antibodies; and
from a monoclonal anti-PD1 or anti-PDL1 antibody.

According to a particular embodiment, the association according to the invention may further comprise as other therapeutics at least one immunosuppressive drug, such as glucocorticoids, cytostatics (Azathioprine, Methotrexate), antibodies or drugs acting on immunophilins (Cyclosporine, Tacrolimus, Rapamicin).

These other therapeutics can be administered to the mammal patient in the same composition as the non-human mammal polyclonal antibodies directed against cancer cells or the at least one monoclonal antibody selected from the group consisting of anti-PD1 and anti-PDL1 monoclonal antibodies, or in a separate composition.

In particular, these other therapeutics are administered in a composition separate from the non-human mammal polyclonal antibodies directed against cancer cells or the at least one monoclonal antibody selected from the group consisting of anti-PD1 and anti-PDL1 monoclonal antibodies.

In a particular embodiment, the present invention relates to the use of an association of:
non-human mammal polyclonal antibodies directed against cancer cells; and
at least one monoclonal antibody selected from the group consisting of anti-PD1 and anti-PDL1 monoclonal antibodies;
for the preparation of a medicament for preventing and/or treating a cancer in a mammal patient.

In another embodiment, the present invention relates to a method for the prevention and/or treatment of a cancer in a mammal patient, comprising administering to the said mammal patient an association of:
non-human mammal polyclonal antibodies directed against cancer cells; and
at least one monoclonal antibody selected from the group consisting of anti-PD1 and anti-PDL1 monoclonal antibodies.

The present invention also relates to an association of:
non-human mammal polyclonal antibodies directed against cancer cells; and
at least one monoclonal antibody selected from the group consisting of anti-PD1 and anti-PDL1 monoclonal antibodies,
for its use as a medicament.

The present invention is further illustrated by the examples below.

EXAMPLES

Example 1: ELISA Control of Polyclonal Antibodies Obtained by Immunizing Rabbits with a Cancer Cell Line Rabbits are immunized with cells from the murine tumoral cell line Hepa 1.6 (hepatocellular carcinoma) in order to obtain corresponding anti-tumoral polyclonal antibodies.

The said tumoral cells are subcutaneously injected two times, two weeks apart.

Serums are actually collected in the pre-immunized rabbits (Rabbits—J0), 7 days after the first subcutaneous injection (Rabbits—I1+7) and 7 days after the second subcutaneous injection (Rabbits—I2+7) in order to test the ability of the antibodies to recognize the tumoral cells used to immunize the rabbits.

More particularly, the antibody response of the immunized rabbits is measured using a cellular ELISA test on the basis of the Hepa 1.6 cells used to immunize the rabbits. The collected serums are serially diluted: 1:20; 1:60; 1:180; 1:540; 1:1620; 1:4860; 1:14580; 1:43740 into PBS-Bovine serum albumin 0.05% and incubated 2 h at room temperature. After centrifugation and washing of the ELISA plate taking care not to aspirate cells), a peroxidase-labeled goat anti-rabbit antibody (dilution 1/1000) is added and incubated for 1 h and washed again. 50 microliters of TMB is then added, incubated in the dark for 15 minutes. After addition of 10 microliter HCL, optical density is read at 450 nM.

Figure 1:
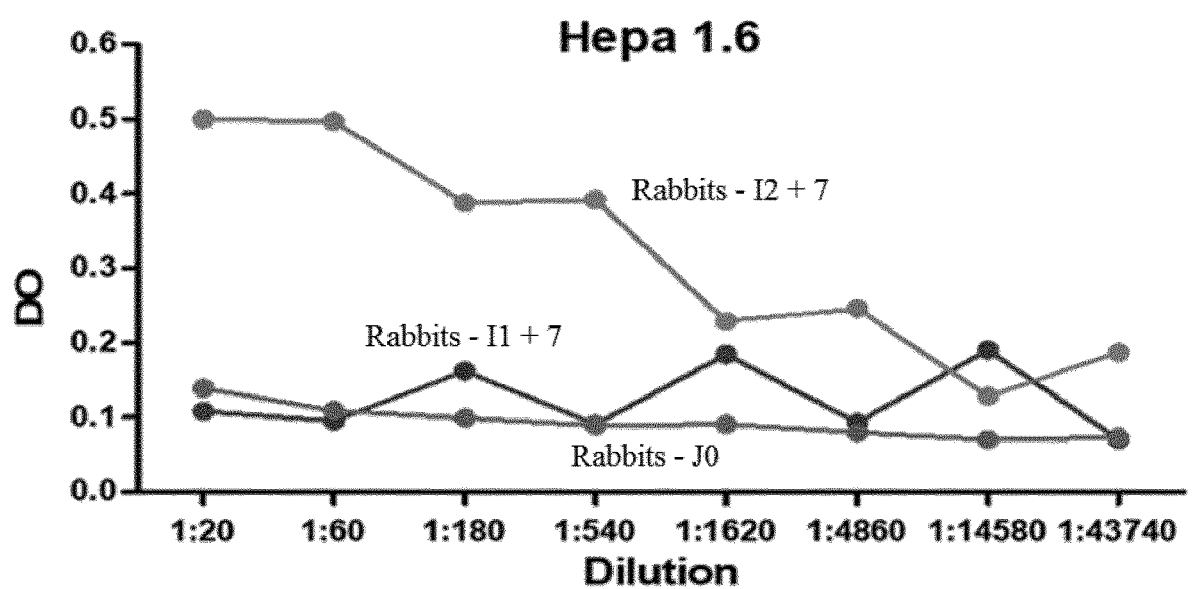
FIG. 1: represents a graph illustrating the antiserum titer determined by ELISA. The serums originate from rabbits immunized with murine tumoral cells from the Hepa 1.6 cell line (hepatocellular carcinoma) and are serially diluted and reacted with purified Hepa 1.6 cells.

The results are represented in FIG. 1.

Comments:

It can be seen that after the second injection, the polyclonal antibodies obtained in the collected sera efficiently recognize the targeted tumoral cells of interest.

Example 2: In Vivo Use of the Collected Polyclonal Antibodies in a Syngeneic and Orthotopic Mice Model The Hepa1.6 hepatocellular carcinoma murine model has been used and described in Gauttier et al., Int J Cancer. 2014 Dec. 15; 135(12):2857-67.

This model is both syngeneic and orthotopic in immunocompetent C57/BL6J mice.

$2.5 \cdot 10^6$ Hepa1.6 cells resuspended in PBS are injected in the portal vein of 8 weeks old male mice, which leads, if non-treated, to a hepatic hypertension and to the death of the animal in 12 to 15 days.

Different treatments were administered 4 days later (D4):
a first group (group 1; n=7; control), received: control isotype (3G8: irrelevant monoclonal antibody (mAb)— isotype IgG1) (8 mg/kg 2 times a week for 28 days)+pre-immune polyclonal antibodies of rabbits (20 mg/kg 2 times a week for 28 days).

a second group (group 2; n=8; comparative), received: control isotype (3G8: irrelevant monoclonal antibody (mAb)—isotype IgG1; 8 mg/kg 2 times a week for 28 days)+polyclonal anti-Hepa 1.6 cells antibodies isolated from the serum of immunized rabbits (20 mg/kg 2 times a week for 28 days).

a third group (group 3; n=8), received: monoclonal anti-PDL-1 antibodies (8 mg/kg 2 times a week for 28 days)+polyclonal anti-Hepa 1.6 cells antibodies isolated from the serum of immunized rabbits; 20 mg/kg 2 times a week for 28 days.

a fourth group (group 4; n=7; comparative), received: monoclonal anti-PDL-1 antibodies (8 mg/kg 2 times a week for 28 days)+pre-immune polyclonal antibodies of rabbits (20 mg/kg 2 times a week for 28 days).

The polyclonal antibodies used correspond to the IgG antibodies obtained according to example 1, purified from the rabbit serums using the method well known to the man skilled in the art involving affinity columns on protein A.

Following these treatments, the clinical scores of the different groups are observed along the 30 days following the tumoral cells injection.

The results obtained are represented in FIG. 2.

The clinical scores, going from 0 to 4, are as follows:

a clinical score of 1 corresponds to animals presenting bristly hairs and a slightly swollen abdomen;

a clinical score of 2 corresponds to animals presenting a swollen abdomen and facial edema.

a clinical score of 3 corresponds to animals presenting a swollen abdomen and an exophthalmia.

a clinical score of 4 corresponds to animals presenting a highly swollen abdomen (diameter>9 cm), prostration, hunched back, isolation (leading to the sacrifice of the animal).

Comments:

As expected, in the control non-treated group 1, all the mice died by the 15$^{th}$ day following the injection of the cells (as represented in FIG. 3).

The results observed are similar for groups 2 and 4, corresponding to the administration of either the purified polyclonal antibodies obtained as mentioned above or the monoclonal anti-PDL1 antibodies. These two separate treatments lead to a reduced clinical score to about 3 after 25 days.

On the contrary, a synergistic effect is observed with the animals from group 3, treated with the combined polyclonal antibodies of the invention and the anti-PDL1 monoclonal antibodies, as they maintain a clinical score of 0 to 1 until day 30 (end of the experiment).

Surprisingly, an attentive observation of the mice from group 3 during several days past this experiment did not allow observing any toxicity and in particular any autoimmunity signs (i.e. no distress, no weight loss, no coloration of the animals, no hairs loss or diarrhea).

Example 3: Polyclonal Antibodies of the Invention Allow the Conversion of a Cold Tumor into a Hot One Rabbits are immunized with mouse B16F10 melanoma cells in order to obtain corresponding anti-tumoral polyclonal antibodies.

B16F10 melanoma cell line is known for being a good example of "cold" tumor and as such as being resistant to anti-PDL1 antibodies, where such antibodies have a very limited effect on the regression of the tumor (Chen et al., Cancer Immunol res. 2014; 3(2):149-60; Ueha et al., 2015; 3(6):631-40).

The IgG fraction of these polyclonal antibodies from rabbits raised against B16F10 cells are infused biweekly (12.5 mg/kg two times a week) from day 4 (D4) to day 30 (D30) to Balb/C mice implanted subcutaneously with B16F10 melanoma cells (DO) (group 2—n=8).

A control group (group 1—n=7) of animals, also implanted subcutaneously with B16F10 melanoma cells, only receives pre-immune polyclonal antibodies of rabbits (20 mg/kg 2 times a week for 28 days).

Tumor biopsies are drawn and analyzed by immunohistology 30 days after injection of the cells (for group 2) or 18 days after said injection for group 1 (as all the individuals from this group are dead).

CD3+ T cells and LY6G+myeloid cells are revealed as illustrated in FIG. 4.

A significantly higher infiltration by T cells and myeloid cells is observed in tumors of animals receiving polyclonal antibodies of the invention against said tumors.

It can thus be seen that the polyclonal antibodies of the invention induced infiltration of CD3+ T cells and myeloid immune cells into the tumor bed.

Therefore, it converted a known "cold" tumor into a "hot" one, which accordingly allows anti-PD1/anti-PDL1 to efficiently play their role in preventing tumor cells from inactivating the T cells that now have access to the tumor, allowing the immune system to work at its full force against the tumor.

The invention claimed is:

1. A method for treating a cancer in a mammalian patient, comprising administering to said patient an association of:
   non-human mammal polyclonal antibodies directed against cancer cells; and
   at least one monoclonal antibody selected from the group consisting of anti-PD1 and anti-PDL1 monoclonal antibodies,
   wherein the polyclonal antibodies are devoid of the two antigenic determinants (i) N-glycolneuraminic acid (Neu5Gc) and (ii) α-1,3-galactose.

2. The method according to claim 1, wherein the polyclonal antibodies are Immunoglobulin G (IgG).

3. The method according claim 1, wherein the monoclonal antibody is an anti-PDL1 antibody.

4. The method according claim 1, wherein the non-human mammal is selected from the group consisting of rodents; lagomorphs; ferrets; felines; canines; goats; sheep; bovines; swine; camelids; horses; and primates.

5. The method according claim 1, wherein the non-human mammal is selected from the group consisting of rodents and lagomorphs.

6. The method according to claim 1, wherein the mammalian patient is selected from the group consisting of rodents; lagomorphs; ferrets; felines; canines; goats; sheep; camels; bovines; swine; alpacas; horses; primates; and human beings.

7. The method according to claim 1, wherein the mammalian patient is a human being.

8. The method according to claim 1, wherein the cancer cells are from a cancer selected from the group consisting of bladder cancer, breast cancer, colorectal cancer, kidney cancer, lung cancer, lymphoma, leukemia, myeloma, melanoma, oral or oropharyngeal cancer, pancreatic cancer, prostate cancer, thyroid cancer, uterine cancer, adenoid cystic carcinoma, adrenal gland tumor, amyloidosis, anal cancer, appendix cancer, cholangiocarcinoma, bone cancer, brain cancer, central nervous system tumors, cervical cancer, esophageal cancer, eye cancer, eyelid cancer, gastrointestinal cancer, HIV/AIDS-related cancer, lacrimal gland cancer, laryngeal or hypopharyngeal cancer, leukemia, liver cancer, meningioma, nasopharyngeal cancer, ovarian cancer, fallopian tube cancer, peritoneal cancer, parathyroid cancer, penile cancer, salivary gland cancer, sarcoma, non-melanoma skin cancer, small bowel cancer, stomach cancer, testicular cancer, thymoma and thymic carcinoma, vaginal cancer and vulvar cancer.

9. The method according to claim 1, wherein the cancer cells are from a liver cancer.

10. The method according to claim 1, wherein the cancer cells are from a cold tumor.

11. The method according to claim 1, wherein the non-human mammal polyclonal antibodies and the at least one monoclonal anti-PD1 or anti-PDL1 antibody are administered to the mammalian patient in the same composition or in separate compositions.

12. The method according to claim 1, wherein the association further comprises at least one additional anticancer drug different from the non-human mammal polyclonal antibodies and from a monoclonal anti-PD1 or anti-PDL1 antibody.

13. The method according to claim 12, wherein the at least one additional anticancer drug is selected from the group consisting of anti-CD137, anti-CTLA4, anti-TIM-3, anti-B7-H3, anti-CD134, anti-CD154, anti-LAG-3, anti-CD227, anti-BTNA3, anti-CD39, anti-CD73, anti-CD115, anti-SIRP alpha, anti-SIRP gamma, anti-CD28, anti-NCR, anti-NKp46, anti-NKp30, anti-NKp44, anti-NKG2D and anti-DNAM-1 monoclonal antibodies.

* * * * *